(12) United States Patent
Ji et al.

(10) Patent No.: US 9,042,260 B2
(45) Date of Patent: *May 26, 2015

(54) MULTI-HOP WIRELESS NETWORKS

(71) Applicant: AT&T Intellectual Property I, L.P., Atlanta, GA (US)

(72) Inventors: Lusheng Ji, Randolph, NJ (US); Bo Han, College Park, MD (US); Robert R. Miller, II, Convent Stn, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/915,009

(22) Filed: Jun. 11, 2013

(65) Prior Publication Data

US 2013/0272166 A1    Oct. 17, 2013

Related U.S. Application Data

(63) Continuation of application No. 12/561,130, filed on Sep. 16, 2009, now Pat. No. 8,483,077.

(51) Int. Cl.
| | |
|---|---|
| *H04W 40/12* | (2009.01) |
| *H04L 12/701* | (2013.01) |
| *H04L 12/721* | (2013.01) |
| *H04L 12/801* | (2013.01) |
| *H04L 12/803* | (2013.01) |
| *H04L 12/851* | (2013.01) |
| *H04L 12/841* | (2013.01) |
| *H04W 40/02* | (2009.01) |

(52) U.S. Cl.
CPC ............... *H04W 40/12* (2013.01); *H04L 45/00* (2013.01); *H04L 45/38* (2013.01); *H04L 47/10* (2013.01); *H04L 47/125* (2013.01); *H04L 47/14* (2013.01); *H04L 47/2408* (2013.01); *H04L 47/286* (2013.01); *H04W 40/02* (2013.01)

(58) Field of Classification Search
None
See application file for complete search history.

(56) References Cited

U.S. PATENT DOCUMENTS

| | | | |
|---|---|---|---|
| 7,065,376 | B2 | 6/2006 | Wolman et al. |
| 7,505,751 | B1 | 3/2009 | Backes |
| 8,077,737 | B2 | 12/2011 | Ji |

(Continued)

OTHER PUBLICATIONS

Han, Bo et al., "Chanel Access Throttling for Improving WLAN QoS," Sensor, Mesh and Ad Hoc Communications and Networks, 2009, SECON '09, 6th Annual IEEE Communications Society Conference, Jun. 22-26, 2009, 9 pages.

(Continued)

*Primary Examiner* — Marcus R Smith
*Assistant Examiner* — Duc Duong
(74) *Attorney, Agent, or Firm* — Abel Law Group, LLP

(57) ABSTRACT

A path configuration message is sent to nodes in a multi-hop network along a path between a source node and destination nodes. The path configuration message includes path information and one or more special channel access parameters associated with the path information. The path configuration message temporarily changes the channel access priority for packets matching the path information in the special message. The nodes along the path therefore have higher channel access priority relative to other nearby nodes and other traffic flows. At the end of the a length of a time determined by a time to live parameter in the special message, the nodes resume using default channel access parameters in place of the special channel access parameters for packets matching the path information.

20 Claims, 2 Drawing Sheets

(56) References Cited

U.S. PATENT DOCUMENTS

| | | |
|---|---|---|
| 8,125,969 B2 | 2/2012 | Ji et al. |
| 8,144,613 B2 | 3/2012 | Roy et al. |
| 8,483,077 B2 * | 7/2013 | Ji et al. .......................... 370/252 |
| 2003/0033394 A1 | 2/2003 | Stine |
| 2003/0204616 A1 | 10/2003 | Billhartz et al. |
| 2004/0022223 A1 | 2/2004 | Billhartz |
| 2004/0037247 A1 | 2/2004 | Ngo |
| 2004/0109428 A1 | 6/2004 | Krishnamurthy |
| 2006/0067283 A1 | 3/2006 | So et al. |
| 2006/0098607 A1 | 5/2006 | Zeng et al. |
| 2006/0098608 A1 * | 5/2006 | Joshi ............................ 370/338 |
| 2006/0114869 A1 | 6/2006 | Kado |
| 2006/0146717 A1 | 7/2006 | Conner et al. |
| 2006/0187840 A1 | 8/2006 | Cuffaro et al. |
| 2006/0259617 A1 | 11/2006 | Lee |
| 2007/0010237 A1 | 1/2007 | Jones et al. |
| 2007/0076742 A1 | 4/2007 | Du et al. |
| 2007/0133447 A1 | 6/2007 | Wentink |
| 2007/0147255 A1 * | 6/2007 | Oyman ......................... 370/238 |
| 2007/0223439 A1 | 9/2007 | Kosai |
| 2007/0286139 A1 | 12/2007 | Niu et al. |
| 2008/0055070 A1 * | 3/2008 | Bange et al. ............. 340/539.12 |
| 2008/0137620 A1 | 6/2008 | Wang et al. |
| 2008/0170521 A1 | 7/2008 | Govindan et al. |
| 2009/0073921 A1 | 3/2009 | Ji et al. |
| 2009/0129323 A1 | 5/2009 | Chen et al. |
| 2009/0238075 A1 | 9/2009 | Mosko |
| 2009/0252178 A1 * | 10/2009 | Huttunen et al. ............. 370/445 |
| 2010/0008247 A1 | 1/2010 | Kwon et al. |
| 2010/0074161 A1 | 3/2010 | Munari et al. |
| 2011/0032883 A1 | 2/2011 | Patil et al. |
| 2011/0182231 A1 | 7/2011 | Wang et al. |
| 2012/0051253 A1 | 3/2012 | Ji |
| 2012/0207143 A1 | 8/2012 | Banerjee et al. |
| 2012/0219006 A1 * | 8/2012 | Mizutani et al. ............. 370/400 |

OTHER PUBLICATIONS

U.S. Appl. No. 12/336,069, filed Dec. 16, 2008, entitled "Method and Apparatus for Adjusting EDCA Channel Access Parameters".

Han, Bo et al, "Channel Access Throttling for Improving WLAN QoS," Sensor, Mesh and Ad Hoc Communications and Networks, 2009, SECON '09, 6th Annual IEEE Communications Society Conference, Jun. 22-26, 2009, 9 pages.

\* cited by examiner

MULTI-HOP WIRELESS NETWORKS

CROSS-REFERENCE TO RELATED APPLICATION(S)

This application is a continuation of U.S. patent application Ser. No. 12/561,130, filed Sep. 16, 2009, entitled "QOS in Multi-Hop Wireless Networks", naming Lusheng Ji, Bo Han, and Robert R. Miller II as inventors, which is incorporated herein by reference. This application also relates to U.S. patent application Ser. No. 12/336,069, filed Dec. 16, 2008, which application is incorporated herein by reference.

BACKGROUND

1. Field of the Invention

This application relates to wireless multi-hop networks and more particularly to utilization of access protocols in wireless multi-hop networks.

2. Description of the Related Art

Quality of Service (QoS) in multi-hop wireless networks is difficult to support for several reasons. Wireless communication is broadcast in nature and transmissions by any node nearby may cause contention for wireless access and delay a node's transmissions. Contention for channel access is usually resolved by a protocol involving random decisions. Thus, who gets channel access and when is not deterministic. Such dynamics in multi-hop wireless networks makes supporting parameterized QoS, such as guaranteeing delay bound, extremely difficult. The dynamic nature of traffic flows combined with dynamics in network forwarding topology in such a network also make QoS provisioning difficult.

Current QoS solutions focus on only providing Differentiated Service type of QoS. The capability is already supported by commercial off the shelf wireless LAN products. However, even in single hop wireless networks such as infrastructure mode WLAN, such an approach only improves QoS of traffic statistically for one class relative to other traffic classes, but not among traffic flows within the same class. In a multi-hop network, the situation is much worse because various uncertainties for each individual communication link are now compounded over all links along a forwarding path.

SUMMARY

Accordingly, in one embodiment, a method is provided that includes receiving a path configuration message at one or more nodes in a multi-hop network, the message including path information and one or more special channel access parameters associated with the path information. The one or more nodes transmit from the one or more nodes that received the path configuration message, any traffic matching the path information, using the associated special channel access parameters. The path configuration message may also include a time to live parameter specifying a length of time that the one or more special channel access parameters are valid. In an embodiment, the one or more nodes discard the special channel access parameters upon expiration of the length of time and resume using default channel access parameters in place of the special channel access parameters.

In another embodiment, a method is provided that includes receiving in a node of a multi-hop network as part of a message directed to the node and other nodes in the multi-hop network, a default path configuration message to adjust default channel access parameters in the node and the other nodes, the default path configuration message further including a time to live parameter indicating how long the adjusted default channel access parameters are valid. The node reverts back to earlier default channel access parameters used in the node prior to receipt of the default path configuration message in response to expiration of a length of time corresponding to the time to live parameter.

In still another embodiment, a method is provided that includes transmitting a path configuration message to a plurality of nodes in a multi-hop wireless network, the path configuration message including path information and one or more channel access parameters associated with the path information, the path configuration message including a time to live parameter specifying how long the channel access parameters are valid.

In another embodiment, a wireless node is provided that includes a transmitter and receiver. The wireless node is responsive to receipt of a path configuration message including path information and one or more special channel access parameters associated with the path information, to record the path information and associated special channel access parameters. The wireless node is further responsive to transmit packets with matching path information according to the special channel access parameters and to transmit other packets not matching the path information with different channel access parameters.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

In order to accomplish improved QoS services by providing communication channel access in a more deterministic fashion in a multi-hop network, special messages are sent to nodes in the network that dynamically configure the channel access parameters of those nodes. The messages may be sent along a path between a source and a destination in the multi-hop wireless network. In an embodiment, the special messages temporarily change the channel access priority of nodes along the path for packets matching the path information in the special messages. The nodes along the path therefore can have higher channel access priority relative to other nearby nodes and other traffic flows. As a result, the nodes receiving the special messages may access the communication channel in a more deterministic fashion and the QoS of traffic flows carried by such a path can be improved in multi-hop networks such as wireless mesh networks.

Figure 1:
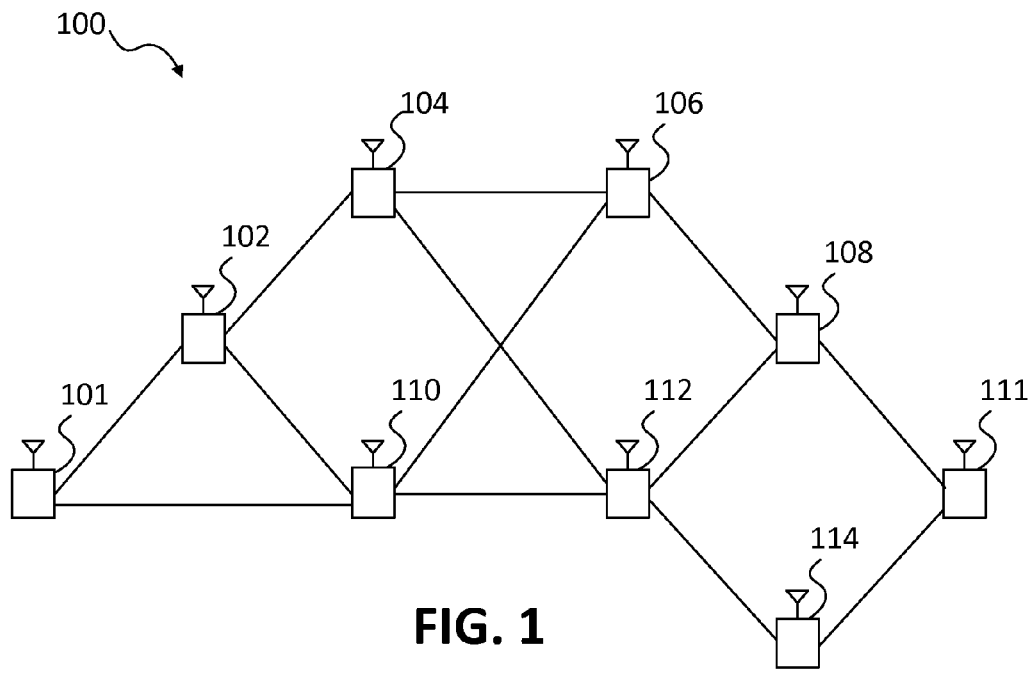
FIG. 1 illustrates an exemplary multi-hop network.
Figure 2:
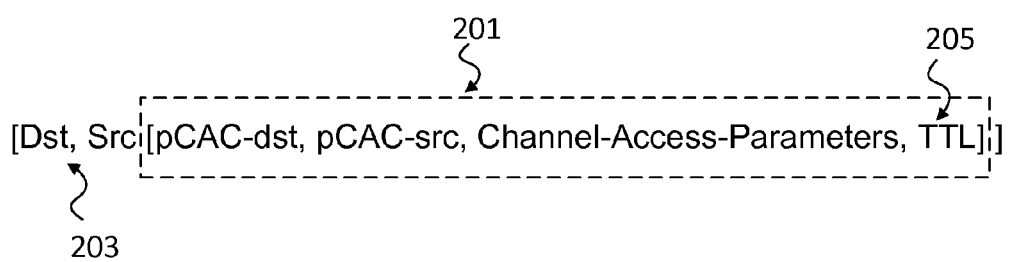
FIG. 2 illustrates an exemplary path Channel Access Configuration (pCAC) message.

Referring to FIG. 1, shown is an exemplary multi-hop network 100 with multiple wireless nodes 101. In order to configure the multi-hop network according to an embodiment of the invention, a special message is sent through the network called a path Channel Access Configuration (pCAC) message. The pCAC message contains the identities of the end nodes, i.e. the source and the destination nodes, Channel Access Configuration (CAC) parameters, which include collision avoidance parameters, exemplary ones of which are described further herein. In addition, a value for time to live is typically specified. FIG. 2 illustrates an exemplary format for such a pCAC message. The inner encapsulation 201 is the pCAC message itself, while the outer encapsulation 203 is for the transport envelope used in the multi-hop wireless network.

The particular channel access parameters that are included in the pCAC message are determined by the protocols used in the multi-hop network. For example, one embodiment may utilize a contention-based approach, in particular the Carrier Sense Multiple Access Collision Avoidance (CSMA-CA) approach. In this contention based approach, when a node wants to transmit over the communications channel, it first senses whether the channel is available. If the channel is determined to be busy, the node waits for a waiting time period before attempting to transmit again. The parameters specify the determination of the waiting period and thus how a node should backoff its transmission if it encounters a busy communication channel.

The use of a waiting time period in a contention based approach reduces the possibility of transmission collisions: two member stations transmitting over a communications channel at the same time. However, the waiting time period results in delays in packet transmission from the nodes.

In an exemplary embodiment, the waiting period includes an Arbitration Inter-Frame Space (AIFS) followed by a Contention Window (CW). For a packet to be transmitted, the communications channel must remain idle during the whole AIFS time period and only then does the transmitting node begin its CW count-down phase. On completion of the CW count-down phase, the transmitting node may begin its transmission over the communications channel to the next node in the multi-hop network. The Arbitration Inter-Frame Space (AIFS) is determined by a configuration parameter called Arbitration Inter-Frame Space Number (AIFSN), which specifies the length of the AIFS in terms of time slots. The Contention Window (CW) for a particular transmission is determined randomly between 0 and an upper bound. The initial upper bound is a parameter called minimum CW, or CWmin Every time a transmission fails, the upper bound is doubled until it reaches the maximum upper bound, which is the called CWmax. AIFS is the waiting period during which a node waits if a communication channel was determined to be busy after the channel was checked for an idle condition. The randomly determined contention window determines the time that the node begins a transmission after the AIFS time period, assuming the channel was idle during the AIFS time period.

The parameters AIFSN, CWmin, and CWmax may be set differently for different Quality of Service (QoS) classes. For example, Voice, Video, Best Effort, and Background are different access categories in the IEEE 802.11 Wireless Local Area Network (WLAN) Standards with different channel access parameter values. Setting the channel access parameters to be lower results in shorter wait times and thus a greater likelihood of access (i.e. a higher access priority) to a communications channel. For example, a voice data quality of service class might have lower AIFSN, CWmin, and CWmax values than a video quality of service class, resulting in a greater likelihood of transmission of voice data then video data over a communications channel. By controlling the various channel access parameters associated with transmissions in the multi-hop network, particularly those associated with contention based access mechanisms, a higher likelihood of transmission can be given to certain traffic through the multi-hop network as compared to other traffic.

Figure 3:
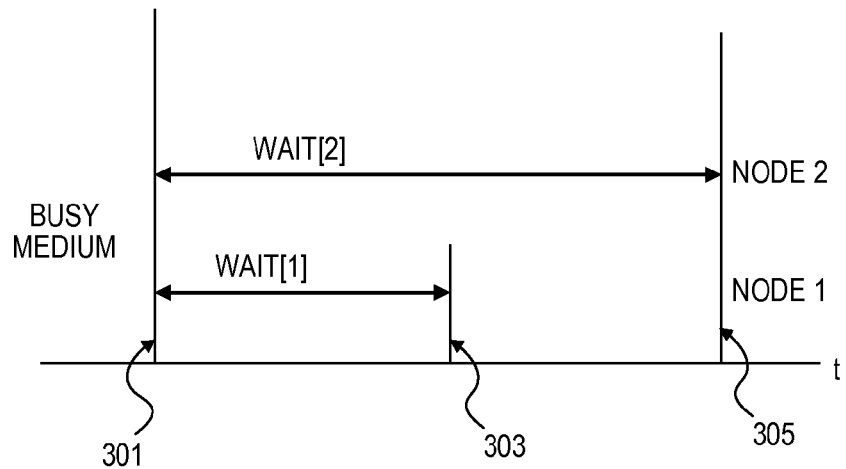
FIG. 3 illustrates conceptually how a node is more likely to gain access to a communication channel with different channel access parameters.

While 802.11 based CSMA-CA protocols may be used, multi-hop networks utilizing other protocols may also advantageously utilize embodiments of the invention. In fact, any channel access parameters that may be adjusted to give a node a higher likelihood of accessing a channel as opposed to another node or another traffic stream within the node may be effectively utilized by embodiments of the invention. FIG. 3 illustrates conceptually how a node is more likely to gain access to a communication channel with different channel access parameters (e.g., the shorter wait period in FIG. 3). As shown in FIG. 3, node 1 and node 2 determine at 301 that the communication medium is busy. Node 1 waits a shorter amount of time and is ready to transmit at 303 while node 2 has to wait until 305. Thus, node 1 is more likely to gain access to the communication channel as compared to node 2. The complexity and approach to the waiting periods can vary among the protocols.

In order to transmit the pCAC message with the channel parameters through the multi-hop network, various transmission mechanisms may be used, including broadcast, multicast, and unicast, which describe the addressing mode used in the outer encapsulation shown in FIG. 2. Broadcast means a message is addressed to all nodes; multicast means a message is addressed to a special group address; and unicast means a message is addressed to a particular node. The terms blind and direct describe the addressing mode used in the inner encapsulation 201 (the pCAC message) in FIG. 2. Different combinations of the addressing modes can be used for different purposes.

The most basic use of a pCAC message is to send it as a direct unicast packet from the source to the destination. That is, the destination (Dst) and the source (Src) in the outer encapsulation refer to the same specific nodes as the pCAC-dst and pCAC-src.

Referring again to FIG. 1, assume node 101 is the source and node 108 is the destination. A direct unicast pCAC message is forwarded along the path from the source 101 to the destination 108 hop by hop (i.e., along nodes 102, 104, and 106). Upon receiving the pCAC message, each node along the path records the source and destination identities contained within the pCAC message and the corresponding channel access parameters. As described earlier, the channel access parameters typically determine waiting/backoff mechanisms for the nodes in contention situations.

Figure 4:
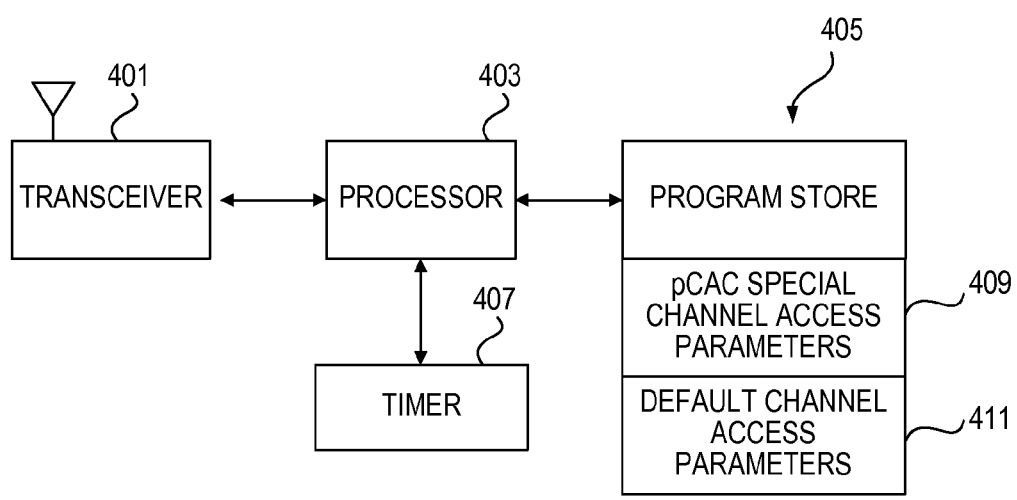
FIG. 4 is a high-level diagram illustrating an exemplary node in the multi-hop network.

An exemplary high-level block diagram of a node is shown in FIG. 4. The node includes a transceiver portion 401 that sends and receives packets on the multi-hop network. In addition, the node includes a control function that may be implemented by a processor 403 to provide appropriate control functionality, and storage 405 to store both control programs, data received and transmitted, as well as the information received in the pCAC messages.

Once the pCAC message has been transmitted from source to destination along the path, any packet traffic with matching source and destination addresses specified in the inner encapsulation (pCAC-dst and pCAC-src) in the nodes along the path from source to destination that received the pCAC message are transmitted using the corresponding channel access parameters.

In addition to the channel access parameters, a time to live (TTL) parameter 205 may be included in the pCAC message as shown in FIG. 2. The time to live (TTL) parameter determines the longevity of the channel access parameters associated with the pCAC message, i.e. how long the parameters should be valid. Thus, e.g., timer 407 (shown separately from the control functionality 403 for illustration) may be loaded with the TTL value and count down to determine the length of time that the channel access parameters associated with the pCAC message are valid. When the timer expires, the special channel access parameters 409 associated with the pCAC message are discarded and subsequent packets of the corresponding flow are forwarded using the default channel access parameters that are maintained in the node at 411.

Note that a node may give higher internal priority to the traffic associated with the pCAC message so that the forwarded packets associated with the pCAC message have higher priority than traffic sourced internally within a node.

Alternative flow matching mechanisms may also be used. For instance, the channel access parameters may be applied to packets going both in directions between the source and destination, instead of only from the source to the destination.

In some embodiments, matching the packet traffic at finer levels is provided by providing additional traffic parameters associated with the packets. For example, additional parameters such as User Datagram Protocol (UDP) or Transmission Control Protocol (TCP) port numbers may be specified in the pCAC message. The port numbers identify data structures in the destination. Transmission Control Protocol (TCP) and the User Datagram Protocol (UDP), use a numerical identifier (port number) to identify with more particularity a particular structure or function in the destination to which the packet is directed.

Some networks may have forwarding paths that are very unstable. For example, referring to FIG. 1, a path from node 101 to 111 can be seen to have many alternative paths, e.g., 101, 102, 104, 106, 108, 111 and 101, 102, 110, 112, 114, and 111. In some networks the forwarding path between source and destination nodes may change frequently. In such networks having unstable forwarding paths, a source node may use a direct broadcast or multi-cast pCAC so the CAC is configured throughout the whole network (broadcast) or relevant part of the network (multicast). A multi-cast message may be desirable if it is known that only certain nodes may be utilized to transmit a message from the source to the destination. In a broadcast message, for example, such a direct broadcast would specify to every node in multi-hop network 100 that if a packet from, e.g., source node 101 to destination node 111 is transmitted through any path in the network, it is transmitted with the path configuration parameters contained in the pCAC. Using this mechanism, if during the lifetime of a QoS flow the forward path is changed, the flow traffic can still receive appropriate treatment, i.e. with special channel access parameters.

Optionally, a source node may send out a blind multi-cast or broadcast pCAC message to adjust the default channel access parameters for all nodes in the multi-hop wireless network corresponding to the multi-cast or broadcast message. A multi-cast message may be used where it is known that only a portion of the multi-hop network may be used or affect the interested path for which higher priority is desired. In an embodiment, a blind pCAC message differs from direct pCAC messages in that its pCAC-dst identity is set to NULL. Upon receiving such a blind pCAC message, a node sets its default channel access parameters to what is specified by the pCAC message. In other embodiments, other mechanisms, including a blind pCAC message field (e.g., one bit to specify if blind), may be used to specify whether the message is to affect the default parameters.

A blind pCAC message may also carry a time to live value to specify when the default parameters are to be restored back to their pre-pCAC values. Such a blind broadcast pCAC message can be used to lower the channel access priority of all nodes in the network to enhance the access priority of the interested path. The interested path may be set, e.g., with a direct unicast pCAC message before or after the blind pCAC message to enhance the access priority of the path specified in the unicast. Note that a mechanism such as sequence numbering may be required to make sure there is no conflict between concurrent blind pCAC messages from different sources.

A source may wish to recall a pCAC configuration it has sent out before the expiration of the channel configuration parameters in the pCAC messages. In such a situation the source may use a direct unicast, multi-cast, or broadcast pCAC message with the pCAC-src and pCAC-dst set to the same value as the pCAC message to be recalled, but with the time to live value set to 0. Upon receiving such a pCAC message, a node replaces the original pCAC message with the new one but discards it because the TTL has expired, thus recalling the pCAC configuration originally sent out.

One major benefit of the present invention is to provide a method for a multi-hop wireless network to be able to establish a bi-directional packet forward "highway" between a pair of nodes which are separated by multiple wireless forwarding hops for delivering urgent communications and communications that demand parameterized QoS such as delay bound. This method is particularly valuable to allow emergency calls, such as E911, to go through a multi-hop wireless network with increased determinism.

Thus, various embodiments have been described for improving QOS in multi-hop wireless networks through path channel access throttling. Note that the description of the invention set forth herein is illustrative, and is not intended to limit the scope of the invention as set forth in the following claims. Variations and modifications of the embodiments disclosed herein may be made based on the description set forth herein without departing from the scope of the invention as set forth in the following claims.

What is claimed is:

1. A method comprising:
    receiving a path configuration message at one or more nodes in a multi-hop network, the path configuration message including path information, one or more channel access parameters associated with the path information, and a time to live parameter specifying a length of time that the one or more channel access parameters are valid;
    transmitting from the one or more nodes that received the path configuration message, any traffic matching the path information, using the one or more channel access parameters; and
    the one or more nodes discarding the one or more channel access parameters in response to expiration of the length of time and resuming using default channel access parameters in place of the one or more channel access parameters.

2. The method as recited in claim 1 wherein the one or more channel access parameters cause the traffic matching the path information to be forwarded by the one or more nodes to have increased channel access priority.

3. The method as recited in claim 1 further comprising:
    sending the path configuration message to nodes along a path from a source node to a destination node in the multi-hop network.

4. The method as recited in claim 1 wherein the path information includes a source node and a destination node.

5. The method as recited in claim 4 wherein the one or more channel access parameters are applied to traffic going in both directions between the source node and the destination node.

6. The method as recited in claim 4 wherein the path information further specifies a port number and traffic has to match the port number and the source and destination nodes to be transmitted from the one or more nodes using the one or more channel access parameters.

7. The method as recited in claim 1 wherein the one or more channel access parameters include one or more collision avoidance parameters.

8. The method as recited in claim 1 further comprising:
transmitting a default path configuration message to the one or more nodes in the multi-hop network to adjust the default channel access parameters in the nodes.

9. The method as recited in claim 8 further comprising:
utilizing the adjusted default channel access parameters for a second time period specified in a second time to live parameter in the default path configuration message; and
responsive to the end of the second time period using the default channel access parameters.

10. A method comprising:
transmitting a first path configuration message to a plurality of nodes in a multi-hop wireless network, the first path configuration message including path information and one or more channel access parameters associated with the path information, the path configuration message including a time to live parameter specifying how long the one or more channel access parameters are valid; and
recalling the first path configuration message by transmitting a second path configuration message to the plurality of nodes, the second path configuration message including the path information and a time to live parameter having a predetermined value.

11. The method as recited in claim 10 wherein the predetermined value is zero.

12. The method as recited in claim 10 further comprising transmitting the path configuration message along a path from a source node to a destination node in the multi-hop network corresponding to the path information, the one or more channel access parameters increasing the channel access priority for traffic being transmitted along the path from the source node to the destination node before recalling the path configuration message.

13. The method as recited in claim 12 wherein the path information specifies packets going in both directions between the source node and destination node and the one or more channel access parameters are applied to information going in both directions.

14. A wireless node comprising:
a transmitter and receiver;
the wireless node responsive to receipt by the receiver of a path configuration message including path information and one or more channel access parameters associated with the path information, to record the path information and the one or more channel access parameters; and
the wireless node further responsive to transmit via the transmitter, packets with matching path information according to the one or more channel access parameters and to transmit other packets not matching the path information with default channel access parameters;
wherein the one or more channel access parameters provide increased channel access priority for packets matching the path information as compared to the default channel access priorities;
wherein the wireless node is further responsive to a time to live parameter in the path configuration message to resume using the default channel access parameters in place of the one or more channel access parameters after a length of time specified in the time to live parameter has elapsed.

15. The wireless node as recited in claim 14 wherein the path information includes at least one of a source identifier and a destination identifier.

16. The wireless node as recited in claim 15 wherein the path information further specifies a port number and packets have to match the port number and the source and destination identifiers in order be transmitted from the wireless node using the one or more channel access parameters.

17. The wireless node as recited in 14 further responsive to a received default path configuration message to adjust default channel access parameters in accordance with the default path configuration message.

18. The wireless node as recited in claim 17 wherein the wireless node is responsive to a time to live parameter in the default path configuration message to revert back to previous default channel access parameters after a time period determined by the time to live parameter in the default path configuration message has expired.

19. The wireless node as recited in claim 14 wherein the path information specifies packets going in both directions between a source node and a destination node and the wireless node is responsive to the path information to transmit packets using the one or more channel access parameters in both directions.

20. The wireless node as recited in claim 14 further responsive to a second path configuration message including the path information and a time to live value of zero to revert to the default channel access parameters.

* * * * *

UNITED STATES PATENT AND TRADEMARK OFFICE
CERTIFICATE OF CORRECTION

| | | |
|---|---|---|
| PATENT NO. | : 9,042,260 B2 | |
| APPLICATION NO. | : 13/915009 | |
| DATED | : May 26, 2015 | |
| INVENTOR(S) | : Lusheng Ji et al. | |

It is certified that error appears in the above-identified patent and that said Letters Patent is hereby corrected as shown below:

ON THE TITLE PAGE, ITEM 57

In the Abstract, line 10, please replace "the a length" with --a length--;

IN THE CLAIMS

Column 8, line 28, In claim 16, line 4, please insert --to-- after "order".

Signed and Sealed this
Twenty-fourth Day of November, 2015

Michelle K. Lee
*Director of the United States Patent and Trademark Office*